United States Patent Office 2,732,156
Patented Jan. 24, 1956

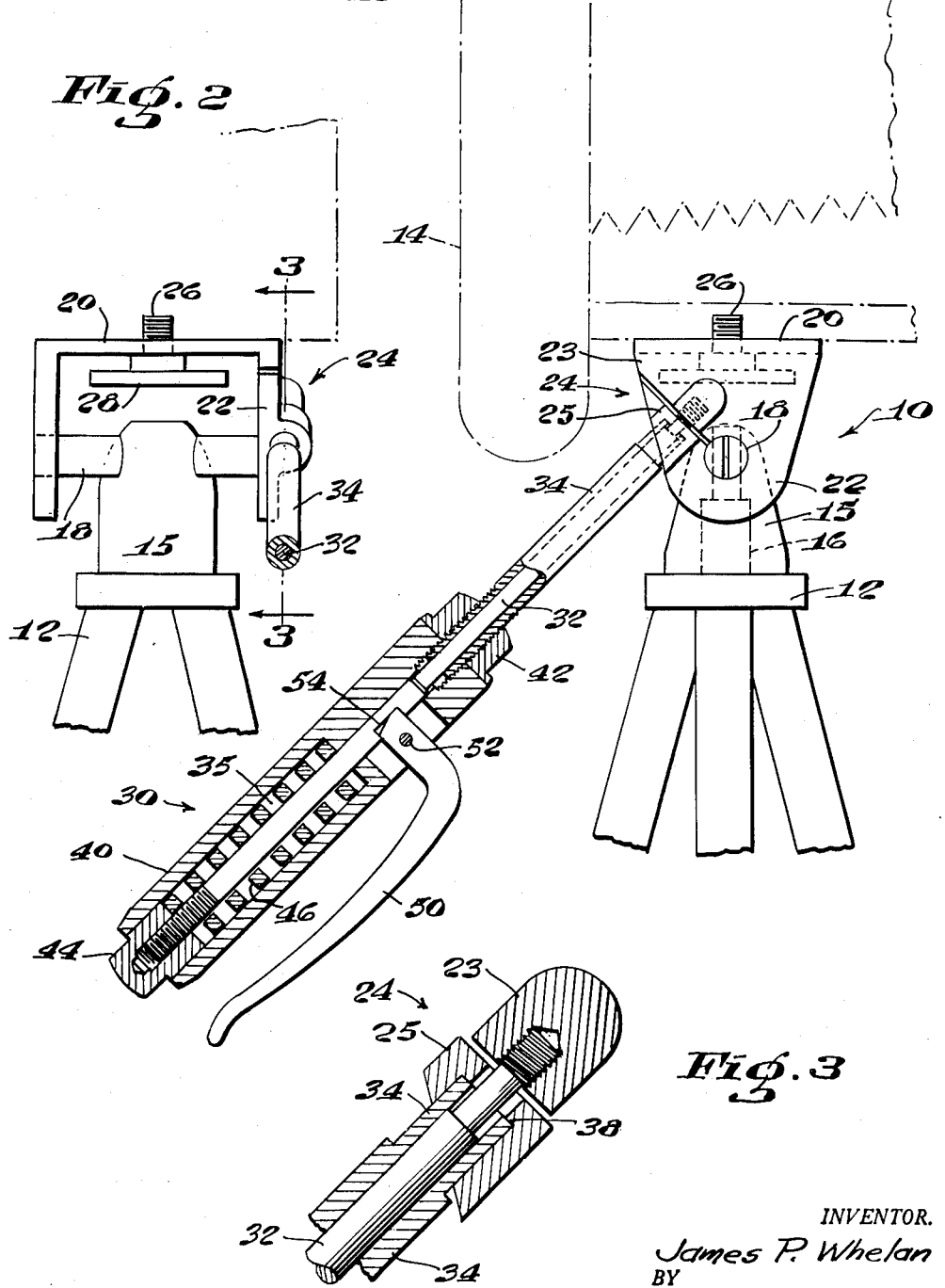

2,732,156
ADJUSTABLE CAMERA MOUNTING
James P. Whelan, Braintree, Mass.
Application October 11, 1952, Serial No. 314,391
5 Claims. (Cl. 248—185)

This invention relates to an adjustable camera mounting and relates more particularly to a locking handle for an adjustable camera mounting.

The invention has for an object to provide a novel and improved adjustable camera mounting adapted to be clamped in its adjusted position and which is characterized by a novel locking handle arranged to releasably clamp the adjustable structure in a simple and efficient manner.

With this general object in view and such others as may hereinafter appear, the invention consists in the releasable locking handle for an adjustable camera mounting as hereinafter described and more particularly defined in the claims at the end of this specification.

In the drawings illustrating the preferred embodiment of the invention:

Fig. 1 is a side elevation of an adjustable camera mounting illustrating the locking handle in cross section;

Fig. 2 is a rear view of the same with the locking handle broken away; and

Fig. 3 is a detail view in cross section of the upper portion of the unlocking handle, the section being taken on the line 3—3 of Fig. 2.

In general, the present invention contemplates an improved locking handle for an adjustable supporting structure, such as a camera mounting capable of adjustment on horizontal and vertical axes and may comprise a conventional universal mounting for connection to a tripod and having provision for supporting a camera. Such universal mountings are provided with a split clamping element, and prior to the present invention a handle associated with the split clamping element has been employed for locking the mounting in its adjusted position. In the operation of the prior mounting when adjustment was required, the handle was rotated in one direction to loosen the clamping element and then used to turn the universal mounting to its adjusted position whereupon the handle was rotated in the opposite direction to clamp the mounting in its adjusted position.

In accordance with the present invention, provision is made for automatically locking the clamping element by tension operated means adapted to be quickly and easily retracted to permit adjustment of the mounting and to thereafter be locked in its adjusted position by the tension means.

Referring now to the drawings, the adjustable camera mounting illustrated generally at 10 may comprise a conventional adjustable supporting structure mounted on a tripod 12 and having provision for supporting a camera indicated at 14. As herein illustrated, the mounting 10 is provided with a base portion 15 arranged to be rotated on a vertical post 16 mounted on the tripod, the upper end of the post extending through a horizontally mounted pin 18 upon which the camera support 20 is adjustably mounted. The camera support comprises an inverted U-shaped member having bearing portions mounted on the outer ends of the pin 18, the pin being split longitudinally and arranged to embrace the upstanding post 16 to effect clamping thereof, and one of the bearing portions 22 of the camera support is provided with a split clamping element 24 arranged to be clamped about the pin 18 to effect locking of the structure about the upstanding post 16 and about the horizontal pin 18, as will be readily understood. The upper portion of the camera support 20 comprises a platform upon which the camera is mounted, and the platform is provided with a standard connecting screw 26 extended upwardly therethrough and which is arranged to be rotated by the head portion 28 of the screw disposed below the platform portion.

In accordance with the present invention, the locking handle indicated generally at 30 is arranged to cooperate with the clamping element 24, and as herein shown, the locking handle comprises an elongated central rod 32 threadedly or otherwise fixedly engaged with the fixed portion 23 of the clamping element, and a sleeve member 34 slidingly mounted on the rod 32 for cooperation with a flexible portion 25 of the clamping element. The flexible portion 25 is provided with a clearance opening having a shouldered portion 38 against which the end of the sleeve 34 is arranged to bear to effect clamping of the element. The sleeve member is externally threaded at its lower end and is threadedly engaged in the upper end of a handle portion 40. An adjusting nut 42 may be provided for locking the sleeve 34 in its adjusted position relative to the handle 40 and the rod 32. The lower end of the handle portion 40 is provided with a hollow portion 35 through which the elongated rod 32 extends, the lower end of the rod being threaded and provided with an adjusting nut 44. A coil spring 46 wound about the rod 32 is arranged to bear against the nut 44 at the end of the rod 32 and against the closed end of the hollow portion of the handle 40. The spring 46 thus tends to urge the handle and sleeve member upwardly against the shouldered portion 38 of the flexible element 25 of the clamping element 24 to effect clamping of the same about the pin 18. In order to release the clamping element, a trigger 50 is pivotally mounted on a pin 52 carried by the handle, the end of the trigger extending into a cutout portion 54 of the rod, the other end of the trigger extending downwardly parallel to the handle 40 to be manually engaged by the operator. Thus, when the trigger is rocked in a clockwise direction against the cutout in the stationary rod 32, the sleeve and handle unit will be rocked downwardly to move the sleeve 34 away from the shoulder 38 and thus effect loosening of the clamping element. While thus held, the handle may be moved to rotate the adjustable mounting to a preferred position, and by merely releasing the trigger the coil spring 46 effects locking of the unit in its adjusted position. In practice, the tension of the coil spring 46 may be adjusted by rotation of the adjusting screw 44, the latter being slidingly mounted in the hollow portion 35 of the handle 40.

In assembling the present locking handle, the upper threaded end of the central rod 32 may be fully seated in the threaded opening in the fixed portion 23 of the split clamping element to form a tight connection therewith, and in order to accommodate different clamping elements of this type wherein the depth of the shouldered portion 38 in the flexible portion 25 may vary, the extended position of the sleeve 34 may be adjusted relative to the rod 32 by loosening the adjusting screw 42 and adjusting the sleeve member 34 in the handle 40 and thereafter tightening the nut 42 to lock the sleeve in its adjusted position. With this construction it will be observed that the lower portion of the rod 32 provided with the cutout 54 remains in the same relative position with respect to the handle 40 and the trigger 50 while the end of the sleeve 34 may vary in its extension relative to the rod, as described.

From the above description it will be seen that the present tension operated locking handle is particularly adapted for use with a universally adjustable camera mounting having a clamping element associated therewith and may be used interchangeably with or to replace the standard rotatable threaded locking handle usually supplied with such mountings. However, it will be apparent that the present handle may be used with advantage in other adjustable supporting structures provided with a similar split clamping element.

In practice, the conventional adjustable camera mountings are standardized as to size with respect to the diameter of the rod and the size of the thread so that only a few different sizes of handles are required to accommodate all sizes of clamping units. While the preferred connection of the rod 32 to the fixed portion 23 of the clamping element may be a threaded connection, it will be apparent that other means of fixedly connecting the rod to the element may be employed.

While the preferred embodiment of the invention has been herein illustrated and described, it will be understood that the invention may be embodied in other forms within the scope of the following claims.

Having thus described the invention, what is claimed is:

1. An adjustable supporting structure having a split clamping element including a fixed portion and a flexible portion, a locking handle associated with said clamping element comprising an elongated rod extended through said flexible portion and secured to said fixed portion, a sleeve slidably mounted on said rod, a spring connected between the rod and the sleeve urging the sleeve into clamping engagement with said flexible portion, and means mounted in said sleeve and engageable with the rod for effecting retraction of the sleeve free of said flexible portion.

2. An adjustable supporting structure having a split clamping element comprising a fixed portion and a flexible portion, a locking handle associated with said clamping element comprising an elongated central rod extended through said flexible portion and secured to said fixed portion, a handle portion having a sleeve member slidably mounted on said rod and engageable with said flexible portion, a spring connected between the rod and the handle portion arranged to urge the sleeve into clamping engagement with said flexible portion, and trigger operated means carried by said handle portion and engageable with said rod for effecting retraction of said sleeve from clamping engagement free of said flexible portion to permit adjustment of said supporting structure, said spring effecting automatic clamping of the adjustable structure upon release of said trigger operated means.

3. In an adjustable camera mounting having a split clamping element comprising a fixed portion and a flexible portion, said fixed portion having a threaded opening and said flexible portion having a clearance opening provided with a shouldered portion, a locking handle associated with said clamping element including an elongated central rod extended through said clearance opening and threadedly engaged with said threaded opening, a handle portion having an extended sleeve slidably mounted on said rod and engageable with said shouldered portion, a spring connected between the handle and the rod arranged to urge the sleeve into clamping engagement with said shouldered portion, said rod having a cutout portion, and a trigger pivotally carried by said handle and engageable with said cutout portion to effect retraction of said sleeve from clamping engagement free of said shouldered portion to permit adjustment of said camera mounting, said spring effecting automatic clamping of the camera mounting upon release of said trigger.

4. In an adjustable camera mounting having a split clamping element comprising a fixed portion and a flexible portion, said fixed portion having a threaded opening and said flexible portion having a clearance opening provided with a shouldered portion, a locking handle associated with said clamping element including an elongated central rod extended through said clearance opening and threadedly engaged with said threaded opening, a handle portion having a sleeve threadedly engaged therewith and extended therefrom and slidably mounted on said rod, the end of said sleeve being engageable with said shouldered portion, said handle having a hollow portion through which said rod extends, a nut secured to the outer end of said rod and slidably engaged with said hollow portion, a spring interposed between said nut and the closed end of said hollow portion arranged to urge the sleeve into clamping engagement with said shouldered portion, said rod having a cutout portion in one side thereof, and a trigger pivotally carried by said handle and engageable with said cut-out portion to effect retraction of said sleeve from clamping engagement free of said shouldered portion to permit adjustment of said camera mounting, said spring effecting automatic clamping of the camera mounting upon release of said trigger.

5. An adjustable camera mounting as defined in claim 4 wherein provision is made for adjusting the sleeve in the handle to vary the extended position of the sleeve relative to said rod.

References Cited in the file of this patent

UNITED STATES PATENTS

| | | |
|---|---|---|
| 2,424,499 | Pasturczak | July 22, 1947 |
| 2,524,473 | Pasturczak | Oct. 3, 1950 |